UNITED STATES PATENT OFFICE 2,349,861

HEAVY LUBRICANT FOR CHEMICAL INDUSTRIES AND PROCESS OF MAKING SAME

Arlan B. Hale, Port Arthur, Tex., assignor to Gulf Oil Corporation, Pittsburgh, Pa., a corporation of Pennsylvania No Drawing. Application February 12, 1942, Serial No. 430,692

2 Claims. (Cl. 252—45)

This invention relates to heavy lubricant for chemical industries and process of making same, and particularly to a lubricant for uses which expose it directly to the action of chemicals such as sulfuric acid, caustic soda, ammonia, calcium chloride, chlorine gas, etc. It is especially suitable for lubricating devices where the lubricant is often exposed to the action of strong chemicals for long periods of time. It is likewise well adapted for use as a protective coating for metal parts exposed to the action of a wide variety of chemicals.

The chemical industries have always had much difficulty due to their inability to maintain lubricant on surfaces which are exposed for long periods of time to various strong chemicals of wide use. The difficulty has been particularly pronounced in locations which are not subject to frequent operation. When exposed to various strong chemicals for any extended period of time other lubricants have dissolved away, been totally broken down, or have charred or coked.

The lubricant of this invention overcomes the above objection and is substantially unchanged after many months of undisturbed exposure to numerous strong chemicals of well known destructive power, such as sulfuric acid, caustic soda, brine, ammonia, etc. The lubricant is also quite stable at elevated temperatures, including temperatures as high as 375° F. It has the extremely uncommon quality of remaining unaffected even after long time exposure to fuming sulfuric acid. The lubricant appears to suffer no deterioration with age.

The heavy lubricant of this invention is made by reacting a mixture of asphalt and petroleum oil with sulfur. This is done at elevated temperatures, e. g. at temperatures of 350° F. to 500° F. At these temperatures the asphalt is sulfurized, and so also to some extent is the oil. In sulfurization of hydrocarbons any vinylene groups

are the first to react with the sulfur, being thereby saturated with sulfur to

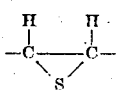

Then additional free sulfur reacts with dimethylene groups

dehydrogenating them with substitution of sulfur, to

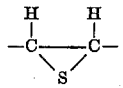

The displaced hydrogen combines with part of the sulfur, forming hydrogen sulfide and passing away as gas.

The asphalt and oil and sulfur may be mixed together at ordinary temperatures or slightly higher and the reaction is effected by heating these in an open or a vented kettle to a temperature within the approximate range of 350° to 500° F., while keeping the mixture well stirred. The use of some open steam during the reaction is advantageous but not indispensable. The displaced hydrogen combines with part of the sulfur to form hydrogen sulfide, a large quantity of this being evolved during the process. When the ebullition of this gas is substantially complete the reaction mixture is cooled to 300° to 450° F. and poured into molds.

Another suitable way of effecting the reaction is to bring the mixture of asphalt and oil to within the desired temperature range, 350° to 500° F., and then add a suitable quantity of sulfur, while stirring.

The oil used in the manufacture of this heavy lubricant may be neutral oil, cylinder stock, bright stock, etc. Oils which are fairly saturated or paraffinic in nature are particularly advantageous. Naphthenic or asphalt base oils are satisfactory but those which are less readily reactive with sulfur give a somewhat superior product for many purposes. The viscosity of the oil is not so important as the degree of sulfurization in determining the tests of the final product, but in general high viscosity oils give finished products characterized by greater stickiness and adhesiveness than do lower viscosity oils. When a product of more "buttery" character is required, lower viscosity oil, or a larger proportion of oil, should be used.

When preparing this heavy lubricant from unblown asphalt the reaction is much slower than when using blown asphalt, and the sulfur required is often twice as much when using unblown asphalt as when using blown asphalt.

The quantity of oil to be used in proportion to the quantity of asphalt may vary from as low as 60 per cent to as high as 180 per cent of the quantity of asphalt, and will most commonly be within the range of 100 per cent to 150 per cent. To make a grease of a particular melting point, use of a low percentage of oil will produce a grease of tacky nature, whereas use of a high percentage of oil will produce a buttery type grease of somewhat higher penetration.

The oil used is advantageously one having a Saybolt Universal viscosity of from 100 seconds to 500 seconds at 100° F., and an oil of about 300 seconds viscosity at 100° F. is particularly good. The lower the viscosity of the oil, the more buttery the nature of the resultant grease, but use of low viscosity oils ofttimes involves difficulties with vaporization of the oil at the temperature used in production of the grease.

When preparing this heavy lubricant from unblown asphalt the reaction is much slower than when using blown asphalt, and similar differences appear in the rate of sulfurization of the oil component. In some cases, in order to prevent disproportionate sulfurization of the oil, it is desirable to add part of the oil at commencement of the sulfurization and to hold back the remainder for addition after sulfurization has proceeded to a substantial degree. On the contrary, with oils which take up sulfur quite slowly, especially if the proportion of such an oil in the mixture is relatively high, the full proportion of oil will be combined with the asphalt from the beginning. In some cases it may even be advantageous to react the oil with sulfur for a time before introducing the asphalt. The rule for determining the procedure is simple—neither the asphalt nor the oil should be permitted to get coky, and the sulfurizing characteristic of the particular asphalt and of the particular oil determine the procedure to be followed. That is, whether the full amount of each should be put in the sulfurizing vessel from the outset or whether all the asphalt or a part of each should be withheld for an interval.

The asphalt used in the manufacture of this heavy lubricant may be either blown or unblown. Unblown asphalt yields a product which is possibly slightly better than the product from blown asphalt, but blown asphalt is more readily reactive with the sulfur and requires much less time for sulfurization. For example, blown asphalt often requires only one quarter as much time as for unblown asphalt, and sometimes even less. This no doubt is due to the fact that the blowing of asphalt effects dehydrogenation with consequent very reactive double bonds. Asphalts having a wide range of physical characteristics are useful in the preparation of this heavy lubricant. An unblown high viscosity residuum from Venezuela asphaltic base crude with a melting point of 63° F. and a viscosity on the Saybolt Universal viscosimeter at 210° F. of 2180 seconds gave a product which was practically the same in penetration and melting point as a product made from a blown asphalt of 231° F. melting point and 14 penetration at 77° F. The blown asphalt required eight hours reaction time while the unblown asphalt residuum required 36 hours under similar conditions. We note that when blown asphalt is operated upon, much of the sulfurization can be accomplished at satisfactory rate at temperatures of 350° F. to 400° F., presumably because of its unsaturated nature.

The sulfur used in the manufacture of this heavy lubricant is advantageously very finely divided, such as flowers of sulfur or sulfur flour. The amount of sulfur used in the reaction is somewhat critical. It will ordinarily be within the approximate range of 5 to 15 parts of sulfur per 100 parts of asphalt, the exact proportion depending on the degree of sulfurization required to attain the desired melting point of the product. The greater the degree of sulfurization the higher the melting point of the product. Asphalt takes up sulfur more readily than oil does and for an asphalt of a given melting point the greater the proportion of asphalt in the charge the less the proportion of sulfur required. An unblown asphalt may require twice as much sulfur as a blown asphalt would require to attain the same penetration test on the product. Viscosity of the oil used will have no substantial effect on the quantity of sulfur required. Using the same proportions of a particular oil and a particular asphalt, a variation in the proportion of sulfur will produce only a change in the melting-point of the product. Within the stated approximate range of 5 to 15 parts of sulfur per 100 parts of asphalt, the precise amount of sulfur to be used in a particular case depends upon the kind and degree of oxidation of the asphalt, the condition of the reaction, and the percentage of oxidized asphalt, if any, in the asphalt and oil mixture. Referring to the conditions of reaction, higher temperatures will require somewhat more sulfur than lower temperatures.

When too little sulfur is used the melting point of the finished product is too low, the penetration test of it is unsatisfactory, and it is not of the right consistency for most satisfactory use. When too much sulfur is used the reaction product attains the appearance of coke and the texture is unsatisfactory.

The following specific examples demonstrate the preparation of this heavy lubricant from very diverse materials. Attention is directed to the notable fact that products of substantially identical melting point and penetration were obtained from materials as dissimilar as a blown asphalt of 231° melting point and 14 penetration at 77° F. and an unblown asphaltic residuum of 63° melting point and 2180 viscosity S. U. V. at 210° F.

*Example No. 1*

The asphalt used in manufacture of the heavy lubricant was a blown asphalt of the following properties:

| | |
|---|---|
| Gravity _____ °A.P.I __ | 6.7 |
| Melting point: | |
|   Ring and ball _____ °F __ | 231 |
| Penetration, A.S.T.M. D 5–25: | |
|   32° F., 200 gram., 60 seconds _____ | 21 |
|   77° F., 100 gram., 5 seconds _____ | 14 |
|   115° F., 50 gram., 5 seconds _____ | 13 |
| Flash, Cleveland open cup _____ °F __ | 545 |
| Fire, Cleveland open cup _____ °F __ | 625 |
| Sulfur, B _____ per cent __ | 1.76 |
| Fixed carbon _____ do ____ | 19.62 |
| Ash _____ do ____ | 0.20 |
| Solubility: | |
|   76° A.P.I. naphtha _____ per cent __ | 68.38 |
|   Carbon disulfide _____ do ____ | 99.79 |
|   Carbon tetrachloride _____ do ____ | 99.93 |
| Loss on heating: | |
|   A.S.T.M. D 6–39 T _____ per cent __ | 1.40 |

Forty parts by weight of the above asphalt, together with sixty parts of a 300 viscosity (S. U. V., 100° F.) Mid-Continent neutral oil were charged to a stirring kettle and heated to 475°–500° F. Stirring was commenced and 6.9 parts of flowers of sulfur were added to this temperature as fast as possible without the material boiling over. A considerable quantity of $H_2S$ was generated and occasional cessation of stirring was helpful in getting the gas out of the mass. After all the sulfur had been added the material was stirred until no more gas was generated—a period of about one-half hour. It was then cooled to below 450° F. (down to 300° F. would be feasible) and filtered through a 40 mesh screen into molds. When cool it was in good condition to be extruded and cut into sticks. The finished grease had the following properties:

Penetration, A.S.T.M. D 217-38 T:
    Unworked, 77° F_____ 46
    Kneaded, 77° F_____ 160
Sulfur (bomb)_____per cent__ 2.1
Melting point, A.S.T.M. D 36-26:
    Ring and ball_____°F__ 316
Appearance_____Shiny black, buttery texture

*Example No. 2*

The asphalt used in the manufacture of this heavy lubricant was an unblown asphalt stock, being a high viscosity residuum from Venezuela asphalt-base crude. It had the following properties:

Gravity_____°A.P.I.__ 9.6
Melting point:
    Ring and ball_____°F__ 63
Viscosity, S. U. V. at 210° F_____ 2180
Flash, Cleveland open cup_____°F__ 480
Fire, Cleveland open cup_____°F__ 575
Pour_____°F__ +85
Carbon residue_____per cent__ 17.3

First 37.6 parts by weight of the above asphalt stock were charged to a kettle equipped with a high speed stirrer, and it was heated to 500° F. Then 3.16 parts of flowers of sulfur were added over a five hour period, using high speed agitation after each addition of sulfur in order to break up foam and liberate hydrogen sulfide. Then 33.2 parts of a 200 viscosity (S. U. V., 100° F.) Mid-Continent neutral oil was stirred in and the temperature adjusted to 500° F.

The remainder of the sulfur, amounting to 3.17 parts, was then added over a five hour period in the same manner as the first. And finally 22.8 parts of the above neutral oil were mixed in and the temperature raised to 515° F. The resulting heavy lubricant was then poured into a mold and allowed to cool. It had the following properties:

Penetration, A.S.T.M. D 217-38 T:
    Unworked, 77° F_____ 45
Melting point, A.S.T.M. D 36-26:
    Ring and ball_____°F__ 324
Appearance_____Black, buttery texture The heavy lubricants of this invention are lubricating greases but they contain no soap. They have very desirable texture and appearance, and their melting points and penetration values readily fall within standard specifications for such materials. They have been shown to afford improved lubrication for use in many places under temperatures up to 350° F. and where they have been exposed for long periods of time to water, caustic, chlorine, litharge solution, salt brine, petroleum oil, vegetable and animal oils, sulfuric acid sludge and alkaline milk-water from the treatment of lubricating oils, cupric chloride solutions, and a variety of acids in different concentrations and including fuming sulfuric acid. Under these conditions of use, both in situations where the parts being lubricated were subject to frequent or continual operation and in situations where the grease remained exposed and undisturbed for long periods, there has been no change in the grease, no breaking down, no coking, no getting hard and stiff, and there has been no sign of deterioration with long age.

In the specification and in the appended claims, the term "asphalt" is used to mean asphalt produced by a reducing distillation of petroleum at atmospheric pressure or less: the term as here used, is not intended to comprehend the heavy by-products of far-going cracking and polymerization which result from gasoline cracking operations. The latter are not useful in the practice of this invention.

What I claim is:

1. A normally solid composition of matter comprising the product of reacting sulfur with from 7 to 20 times its weight of a mixture of petroleum asphalt and petroleum oil, the percentage of the asphalt and of the oil in the mixture each being within the range of 35 per cent to 65 per cent.

2. The process of manufacturing a normally solid lubricating composition which comprises reacting 100 parts of a mixture of petroleum asphalt and petroleum lubricating oil with from 5 to 15 parts of sulfur, the lubricating oil having a Saybolt Universal viscosity of from 100 seconds to 500 seconds at 100° F., the mixture containing not less than 35 parts or more than 65 parts of either oil or asphalt, and conducting the reaction at a temperature of the order of 350° F. to 550° F.

ARLAN B. HALE.